Figure 1:
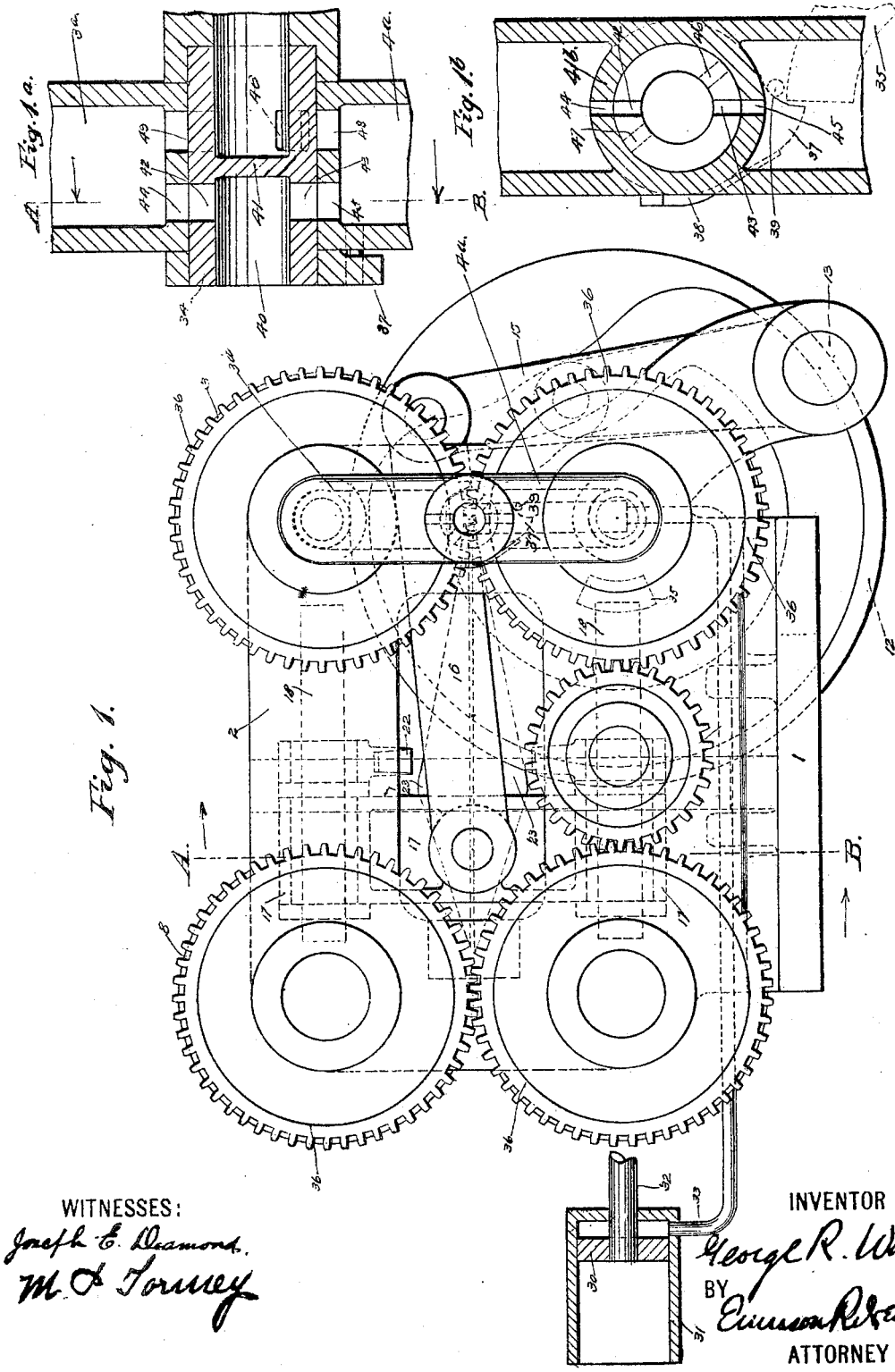

No. 689,998.　　　　　　　　　　　　　　　　Patented Dec. 31, 1901.
G. R. WARD.
BAG MACHINE.
(Application filed Dec. 1, 1900.)

(No Model.)　　　　　　　　　　　　　　　　6 Sheets—Sheet 1.

WITNESSES:　　　　　　　　　　　　　　　　INVENTOR
Joseph E. Diamond　　　　　　　　　　　　George R. Ward
M. A. Torney　　　　　　　　　　　　　　　BY
　　　　　　　　　　　　　　　　　　　　　ATTORNEY No. 689,998. Patented Dec. 31, 1901.
G. R. WARD.
BAG MACHINE.
(Application filed Dec. 1, 1900.)

(No Model.) 6 Sheets—Sheet 3.

WITNESSES:
Joseph E. Diamond
M. T. Torney

INVENTOR
George R. Ward
BY
Emerson R. Newell
ATTORNEY

No. 689,998. Patented Dec. 31, 1901.
G. R. WARD.
BAG MACHINE.
(Application filed Dec. 1, 1900.)
(No Model.) 6 Sheets—Sheet 4.

WITNESSES: INVENTOR
George R. Ward
BY
ATTORNEY

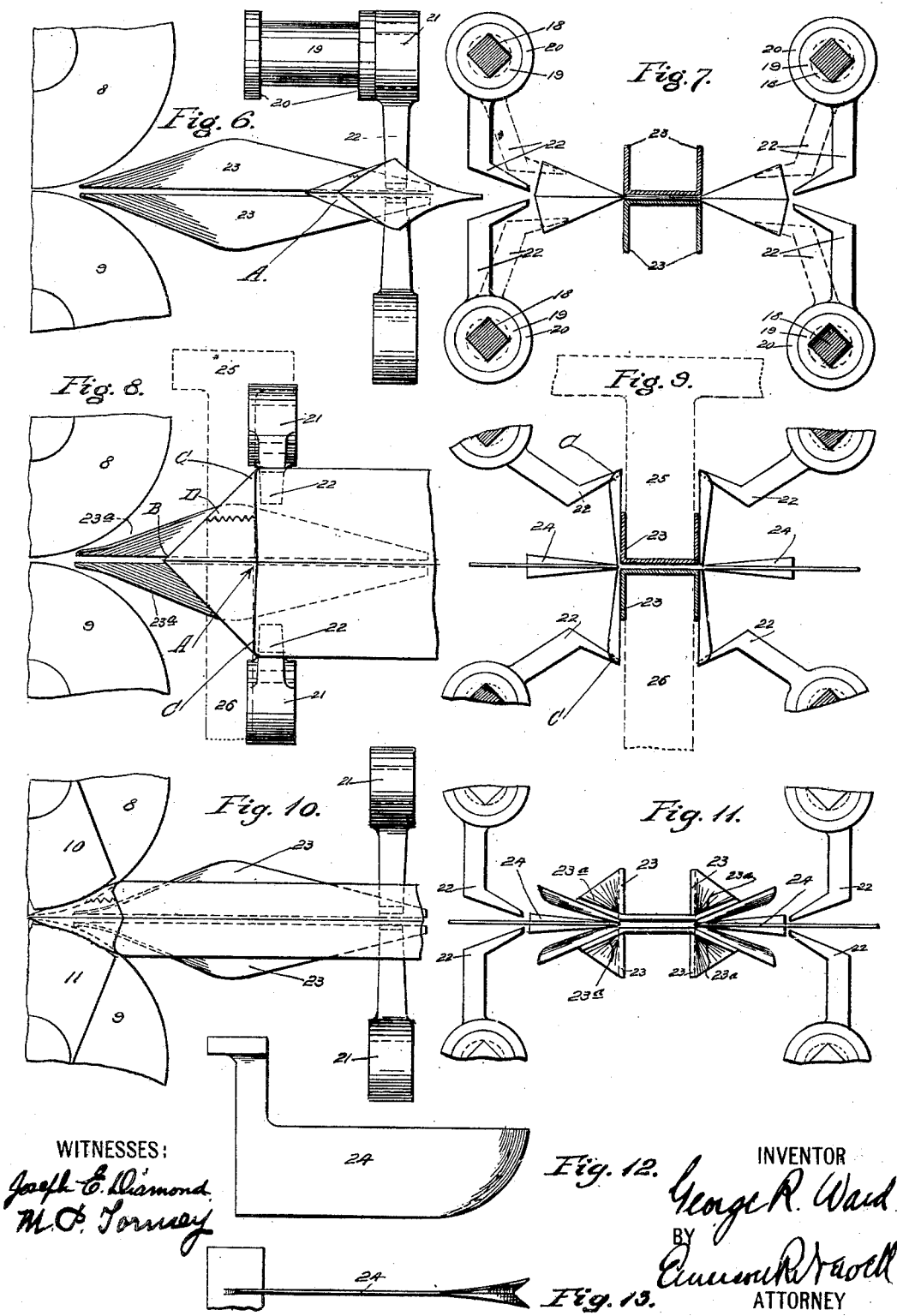

UNITED STATES PATENT OFFICE.

GEORGE R. WARD, OF NEW YORK, N. Y., ASSIGNOR TO CHARLES F. COBURN, OF BOSTON, MASSACHUSETTS.

BAG-MACHINE.

SPECIFICATION forming part of Letters Patent No. 689,998, dated December 31, 1901.

Application filed December 1, 1900. Serial No. 38,319. (No model.)

*To all whom it may concern:*

Be it known that I, GEORGE R. WARD, a citizen of the United States, residing at New York, State of New York, have invented certain new and useful Improvements in Bag-Machines, of which the following is a clear, full, and exact description.

My invention relates to bag-folding machines; and my object is to provide a construction which will receive a bag and fold the same in the manner desired.

It is desirable in a completed bag that when the same is filled with material or distended by the air it should automatically assume a rectangular form and its bottom also have an angular, preferably a rectangular, form.

One object of my invention is to provide a machine which will so fold a bag that the bottom of the same will when the bag is distended in use automatically assume the shape desired.

In the preferred embodiment of my invention shown in the drawings I have provided a machine which will receive a bellows-folded bag in a flattened condition and distend part of the same and fold the corners at the bottom of the bag backward between the plies, whereby the bottom of the bag will automatically assume a rectangular form when the same is distended by air or by the material with which it is filled.

Other advantages of my invention will be apparent, and my invention will be defined in the claims.

Figure 2:
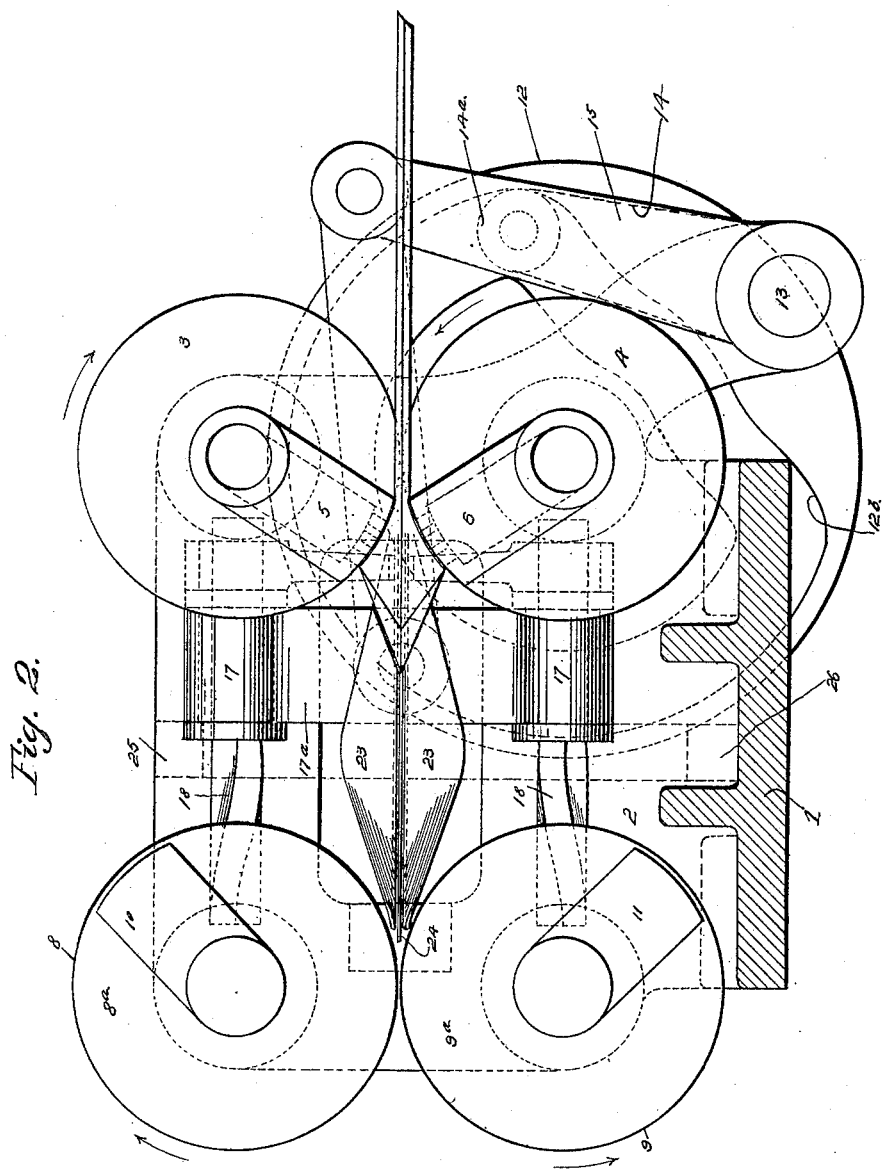
Figure 3:
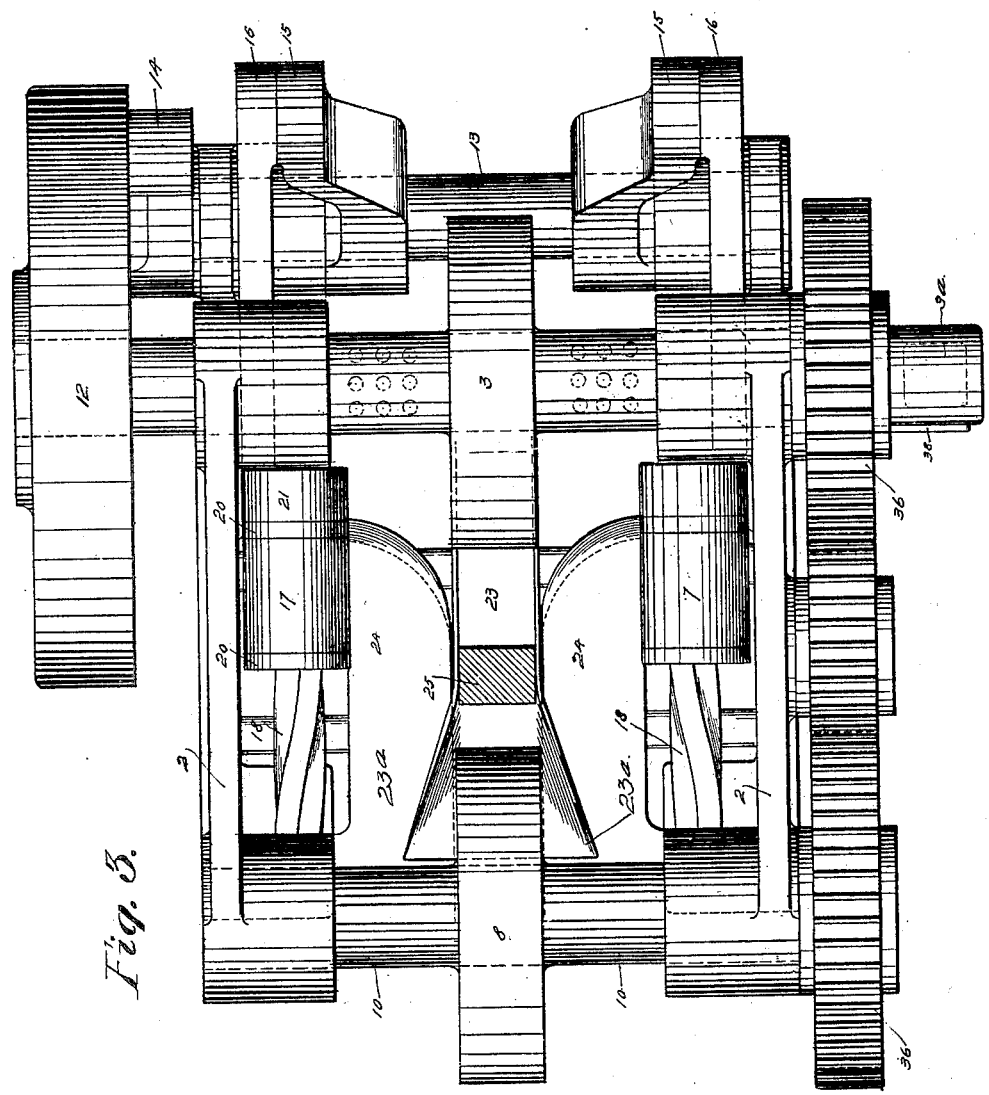
Figure 4:
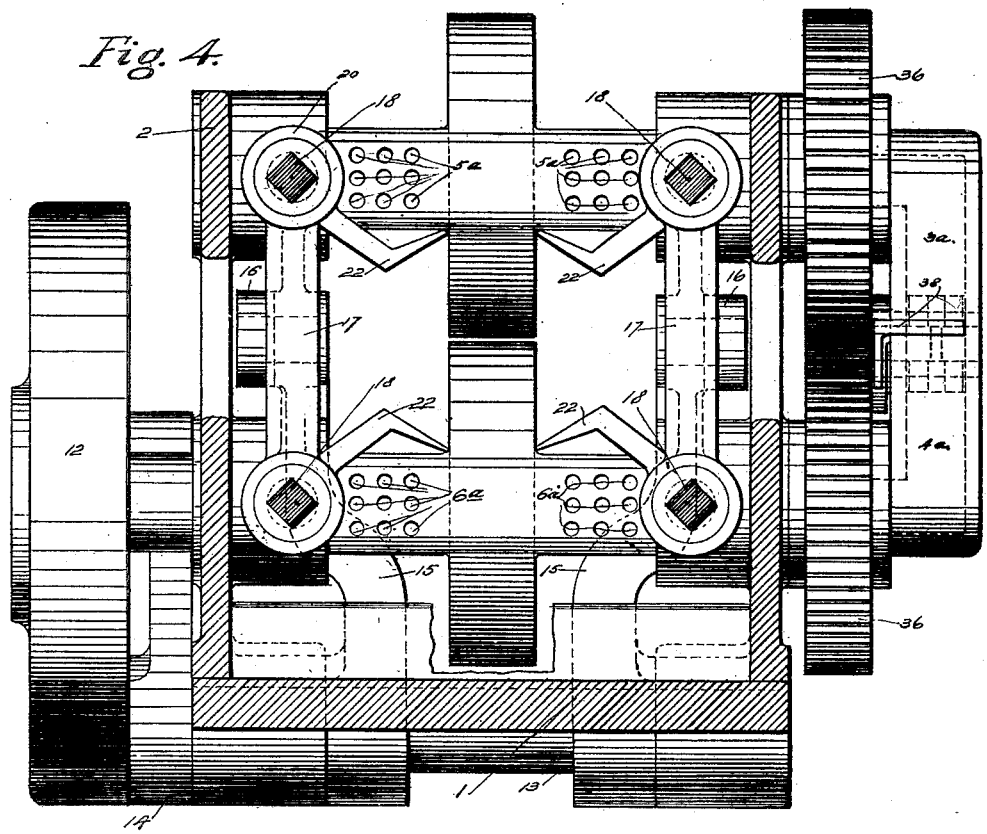
Figure 5:
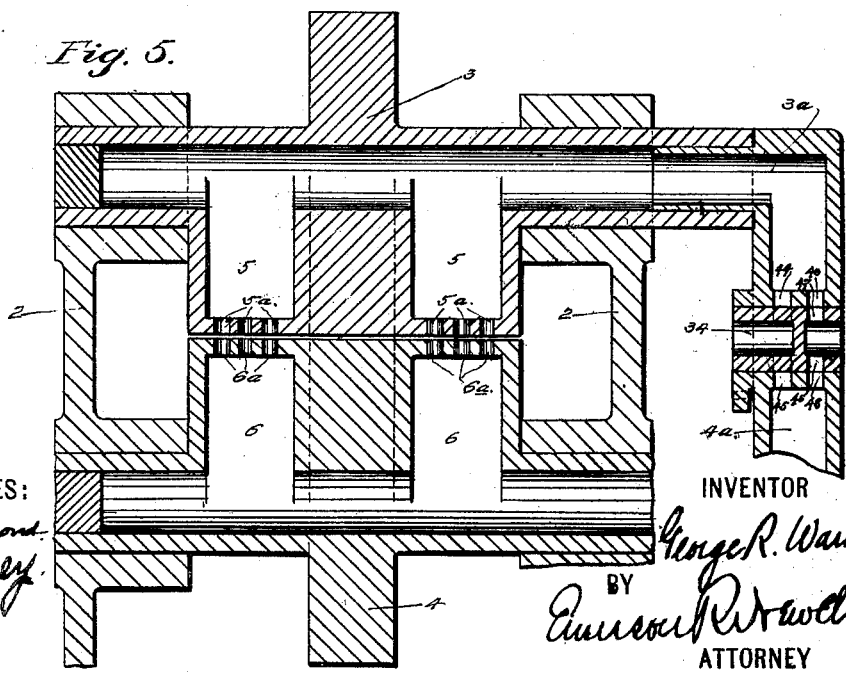
Figure 17:
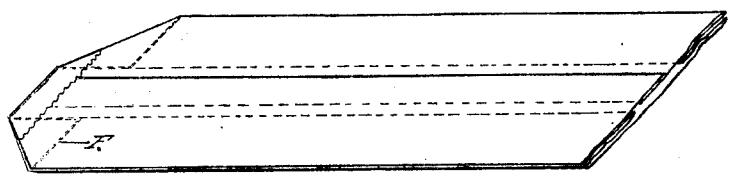
Figure 18:
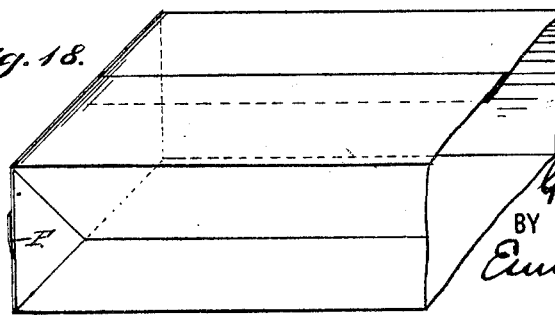

In the above preferred embodiment of my invention shown in the drawings, Figure 1 represents a side elevation. Figs. 1ª and 1ᵇ show details. Fig. 2 is a view similar to Fig. 1, with part of the side frame and some other parts removed to show the interior construction. Fig. 3 is a plan view of Fig. 1, parts being in section and others removed to show the construction more clearly. Fig. 4 shows a section on the line A B of Fig. 1 looking in the direction of the arrows in said figure. Fig. 5 is a detail of the suction-rolls in the position in which the suction-apertures engage the bag ready to distend the same. Figs. 6 to 11, inclusive, are detail views showing steps in the distending and folding operation. Figs. 12 and 13 are plan and side views of one auxiliary folder. Figs. 14 to 17 show the form of the bag at different steps of the operation. Fig. 18 shows the distended form taken by the bag in consequence of being folded by the present preferred construction.

In the above-described preferred construction of my machine, 1 is the base, and 2 2 are the sides of the frame, of the machine on which the parts are mounted.

In the present embodiment of my machine it is designed to receive the well-known bellows-folded bag as it comes from a bag-making machine. By "bag" I do not mean that the bottom must necessarily have been already closed. The bag is received by preferably a set of feed-rolls 3 4, which grasp the bottom-forming end of the bag and feed the same forward, as shown in Fig. 2. In order to distend a part of the bag, (in the present instance the bottom thereof and the plies near the same,) I have provided a rotatable suction device which contracts the bag and is then moved away from the same, preferably by being rotatable with one of the rolls, thus distending the bag. In the present embodiment I have provided two movable suction devices carried by the rolls 3 4. The rolls are preferably shaped as shown in Figs. 4 and 5 and have lateral extensions, as shown in Fig. 4, which are hollowed out to form chambers 5 5 6 6, and each of these chambers is provided with at least one and preferably more suction-apertures $5^a$ $6^a$. In order to exhaust the air from these chambers 5 6, I have in this embodiment made the shafts of the rolls hollow, as shown in Fig. 5, and the chambers 5 6 opening into said shafts. The air may be exhausted from the chambers in any suitable manner. In this embodiment I have shown in Fig. 1 an exhaust-pump for accomplishing this purpose. In said figure, 30 is a piston working in a cylinder 31 and having a piston-rod 32, reciprocated in any suitable manner. I have shown the piston in line with the axis of the lower delivery-roll to indicate that it may be reciprocated by a suitable connection with said roll, so as to move as desired. A pipe 33 is connected with the chambers 5 6 in the rolls 3 4, so that when the piston 30 is moved to the left from the position shown in Fig. 1 air will be exhausted from said hollowed rolls. In order to make a connection at the proper times between the chambers 5 6 of the rolls and the vacuum-chamber of the pump in Fig. 1, I have in this embodiment provided a valve which is automatically opened and closed by the machine. I prefer to have the connection made as the rolls 3 4 come into the position shown in Fig. 5 and continue until the rolls reach the position shown in Fig. 2, when the exhaust should be cut off. In Figs. 1ᵃ and 1ᵇ I have shown enlarged sectional details of the valve, Fig. 1ᵇ being a section on line A B of Fig. 1ᵃ looking in the direction of the arrows, ports 46 47 being shown in dotted lines. Connected with the hollowed shafts of the rolls 3 4 are stationary pipes 3ᵃ 4ᵃ. (See Figs. 1, 1ᵃ, and 5.)

34 is in this embodiment the automatic valve located between the pipes 3ᵃ and 4ᵃ and is thrown from right to left in Fig. 1 by a cam 35, Fig. 1, carried on the outside gear-wheel 36, which comes in contact with the projection 37 on the valve. The valve is normally kept in the position shown in Figs. 1, 1ᵃ, and 1ᵇ by the spring 38, which presses said projection 37 against the stop-pin 39. The tubular portion 40 of the valve is open to the air and is closed by the diaphragm 41. The valve is provided with ports 42 43, which may connect with ports 44 45 in the cylindrical portion 46, Fig. 1ᵇ, of the pipes. The valve normally stands in the position shown in Fig. 1ᵃ, thus connecting the hollowed rolls with the outside air. As the rolls reach the position shown in Fig. 5 the cam 35 strikes the projection 37 and rotates the valve, so that ports 46 47 in the rotatable portion register with ports 48 49 in the cylindrical portion 46 of the pipes, thus closing ports 44 45 and making a connection between the hollowed portions 5 6 of the rolls 3 4 and the vacuum-chamber of the exhaust-pump. I prefer to make the distance between ports 42 47 (and between ports 43 46) slightly greater at the periphery of the valve than the diameter of the port 42 or 43, so that the ports 42 43 will pass away from registry with the ports 44 45 before the ports 46 47 register with the ports 48 49. As the connection is made between the vacuum-chamber of the pump and the hollow rolls, the piston 30 may be pushed to the left, either by hand or by any suitable connection with the machine, and the partial vacuum that is formed in the vacuum-chamber will form a partial vacuum in the hollow portions 5 6 of the rolls, and as the rolls rotate the plies of the bag will be distended. As the rolls reach the position shown in Fig. 2 the cam 35 releases the projection 37, and the valve is thrown back to the position shown in Figs. 1ᵃ and 1ᵇ by spring 38, allowing the air to rush back into the hollowed rolls and release the plies of the bag.

By "vacuum-chamber" I mean any space from which the air has been partially exhausted.

I am aware that it is not necessary in some cases to use a cut-off valve between the vacuum-chamber and the rolls, as the proper vacuum in the rolls might be formed solely by driving the piston 30 to the left at the proper time.

Figure 14:
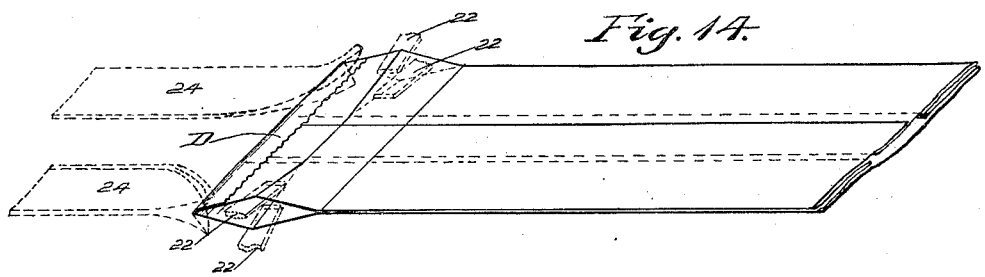
Figure 15:
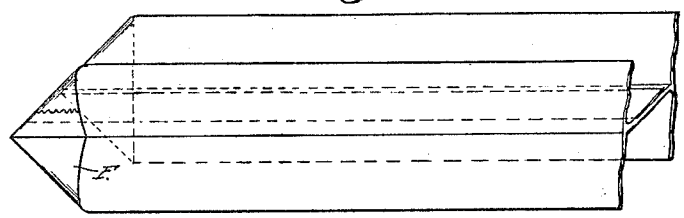
Figure 16:
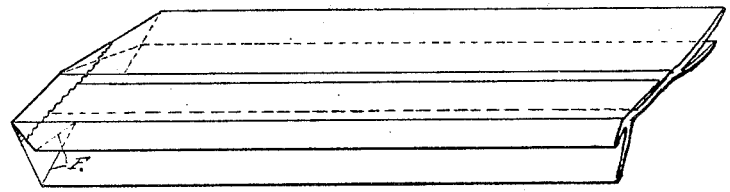

The rolls 3 and 4 in this embodiment rotate continuously in the direction shown by the arrows in Fig. 2, and the bottom end of the bag is gripped between the rolls, preferably a little in advance of the suction-chambers. As the rolls are further advanced the peripheries of the suction-chambers 5 6 will contact with the plies of the bag at a short distance from the bottom edge of the bag, and as the air is exhausted from the chambers 5 6 the plies of the bag near the bottom will be drawn apart, as shown in Figs. 2, 6, and 14, preferably while the central portion of the bag is held flat by the rolls 3 4 and guides 23, between which latter the bag enters as it leaves the bite of the rolls, Figs. 2, 6, and 7. When I speak of the bag as "flattened" I do not mean that the bag must necessarily be absolutely flat, although this is preferable, but only that it should not be fully distended. In order to assist in pulling the plies apart into the position shown in Figs. 8, 9, and 15, I have provided distending devices which in the present embodiment consist of distending-fingers. These fingers may, as shown in the drawings, be provided with hooked ends 22; but obviously the shape of the fingers or their ends may be widely varied, and I therefore do not desire to be limited to the particular construction shown. As the plies of the bag are distended by the movement of the suction-chambers 5 6 the distending-fingers 22 enter between the plies, as shown in Figs. 6, 7, and 14, and move apart to the position shown in Figs. 8 and 9, thus distending the plies of the bag and throwing the same into a substantially vertical position, preferably against the sides of the rolls 3 4. In the present embodiment the forward movement of the bag is not checked to accomplish this result; but the bag continues to move forward. In order that the bag shall not slip over the fingers, by which it might be torn or displaced, and in order that the fingers may remain in the same position relatively to the moving bag, I move the fingers bodily along with the bag while they are thus distending the plies. In the present embodiment this is accomplished by the following means: Each finger 22 is fixed to a collar 20, which is fitted to slide upon an angular spiral guideway 18, running parallel with the direction of movement of the bag. 17 17 are collars located in the grooves 19, Fig. 6, of the collar 20 and are joined by the bridge 17ᵃ, Fig. 2. The collars 20 are rotatable inside of these collars 17. In order to carry forward these collars 20 along with the bag, I have provided arms 16, Figs. 2 and 3, which are attached to said bridges 17ᵃ at one end and at the other to the lever-arms 15, carried on a rock-shaft 13. This shaft is rocked by the lever 14 on the shaft, which lever has a stud 14ª engaging with the cam-slot 12ᵇ in the cam-wheel 12, which is carried on the outer end of the shaft which carries the feed-roll 4. As the bag is advanced to the position shown in Figs. 2, 7, and 14 the cam-wheel 12 causes the arm 16 and bridges 17ª, and therefore the collars 20 and fingers 22, to advance, the spirals throwing the distending-fingers inward to the position shown in dotted lines in Figs. 7 and 14, and as the bag is further advanced the fingers are thrown apart and move outward to the position shown in Figs. 4, 8, and 9 and are then retracted as the cam 12 moves the arms 16 backward to the position shown in Figs. 10 and 11. The distending-fingers 22, therefore, move bodily along with the bag as it advances, and thus avoid the danger of tearing or disarranging the same. In this embodiment the fingers then move along with their ends in the position shown in Fig. 8, so that the fingers thus determine the corner C of the folded-over portion A. (See Figs. 6 and 8.)

In order to cause the bag-bottom when the bag is distended by the material with which it is filled to assume the rectangular form and in order to more clearly define the edges of the bottom, I fold backward—that is, toward the main part—a portion of the bag which is to form the bottom thereof. In this embodiment I fold backward the corners of the bag to a position between the plies. This would be done in a measure by distending the fingers alone, as they would tend to throw the plies apart, which would cause the triangular portion CCB of Fig. 8 to fold back against the distended plies. This folding back of said triangular portion by the fingers alone might in some cases be sufficient; but as my machine preferably receives the bags as they come directly from the bag-forming machine the paste of the seams has not yet set, and the seams are therefore liable to be drawn apart if strain is applied to them. With the seams in this unset condition the operation of the fingers 22 tends to draw apart the bottom seam D. (See Figs. 8 and 14.) In order to assist in folding back the triangular portion of the bottom, and thus prevent undue strains upon the same, as well as to insure the proper folding of the corner, I have provided a folder which in this embodiment at the same time presses against said triangular portion of the bottom to assist fingers 22 in folding back said triangular portion. In the present embodiment this folder consists of the plates 24, the inclined faces of which are preferably grooved, as shown in Fig. 13. The arrangement of the folder is preferably as shown in Figs. 3 and 14, so that the corners of the bag which are to be folded backward will engage in the grooves in the curved faces of said auxiliary folder at about the same time that the fingers 22 commence to distend the plies. These auxiliary folders 24 are in the present embodiment stationary, although I do not desire to be limited to such construction, and as the bag advances they assist in folding the corners back, as shown in Figs. 9 and 11. The edges of said auxiliary folders press against the bottom of the bag, and therefore turn over the triangular portion CCB and press upon this portion, and therefore tend to prevent any undue strain coming upon the seam, which might open the same. When the bag has reached the position shown in Fig. 8, the plies are fully distended, and in order to fold the plies together over upon the corner the guides 23 gradually turn toward each other from the position shown in Figs. 9 and 11 to a nearly parallel position, as shown at 23ª in Figs. 3 and 11, which gradually turns over the plies from the position shown in Fig. 9 to that shown in Fig. 11. The bag is then in the form shown in Fig. 16. As the bag is further advanced, being still in the grasp of the rollers 3 4, it is grasped between the set of rolls 8 9. These rolls are preferably of a form similar to that of the rolls 3 4—that is, having a comparatively narrow central portion 8ª 9ª and lateral portions 10 11, as seen in Fig. 2. The central part of the bag is grasped between the narrow portion 8ª 9ª and drawn forward, and the lateral parts 10 11 are so located that they will come together and compress the turned-in corners, as shown in Fig. 17, thus defining the fold F, Figs. 15 to 18. The parts 10 and 11 are made with a slightly shorter radius than the central portions 8ª and 9ª to allow for the additional thickness of the bag at the corners. When the bag is distended by the entrance of air into the same or by the material with which it is filled, the turned-over corner will tend to make it assume the shape shown in Fig. 18.

I am aware that many changes may be made in the constructions herein disclosed without departing from the spirit of my invention, and therefore I do not desire to be limited to the particular constructions herein shown and described.

What I claim is—

1. In a bag-machine in combination, a rotatable suction device adapted to contact with a flattened completed bellows-folded bag, means to exhaust the air from said suction device and means to rotate the same whereby said bag is distended at its bottom, and means to fold backward part of said distended bottom.

2. In a bag-folding machine in combination, a set of rotatable suction devices adapted to receive between them a completed bellows-folded bag, means to exhaust air from said suction devices and means to rotate the same whereby said bag may be distended at its bottom, and means to then fold part of said distended bottom backward between the plies of the bag.

3. In a bag-folding machine in combination, a set of rotatable suction devices adapted to receive between them a completed bellows-folded bag, means to exhaust air from said suction devices and means to rotate the same whereby said bag may be distended at its bottom, and means to then fold the corners of said distended bottom backward between the plies of said bag.

4. In a bag-machine in combination, a roll adapted to feed forward and hold the central portion of a bellows-folded bag in a substantially flattened condition, a suction device at each side of said roll and rotatable therewith and adapted to contact with the plies of said bag near its bottom-forming end, means to rotate said roll and feed said bag forward, means to exhaust the air from said suction devices whereby said plies are distended, and means to fold the corners of said bag backward between the plies thereof.

5. In a bag-machine in combination, a set of rolls provided with suction devices and adapted to receive between them a bellows-folded bag, means to exhaust air from said suction devices and rotate said rolls to distend the bag, and means to fold the corners of said bag backward between the plies thereof.

6. In a bag-machine in combination, a set of hollowed rolls provided with suction-apertures and adapted to receive between them and feed forward a bellows-folded bag, means to exhaust air from said rolls and rotate the same whereby said plies of said bag may be distended, and means to fold the corners of said bag backward between the plies thereof.

7. In a bag-machine in combination, a roll, a suction device rotatable with said roll and adapted to contact with a flattened bellows-folded bag, means to exhaust air from said suction device to distend said bag at its bottom, means to hold the central portion of said bag flattened as it leaves said roll, and a folding device to fold back the corners of the bag between the plies thereof.

8. In a bag-folding machine in combination, a set of hollowed rolls provided with suction-apertures and adapted to receive between them a bellows-folded bag, means to exhaust air from said rolls and rotate the same whereby the plies of said bag may be distended and the bag fed forward, a pair of distending-fingers and means to insert said fingers between the plies of the bag and move said fingers apart to assist in the distention thereof and means to then fold the corners of said bag backward between said plies.

9. In a bag-folding machine in combination, a set of continuously-rotated rolls, suction devices rotatable therewith and adapted to receive between them a bellows-folded bag, means to exhaust air from said suction devices and rotate the same whereby the plies of said bag may be distended, and means to fold the corners of said bag backward between said plies.

10. In a bag-folding machine in combination, a set of continuously-rotated hollowed rolls provided with suction-apertures and adapted to receive between them a bellows-folded bag, means to exhaust air from said rolls and rotate the same whereby the plies of said bag may be distended, means to hold the central portion of said bag in its normally-flattened condition while the said plies are being distended and means to fold the corners of said bag backward and fold said plies down over said corners.

11. In a bag-folding machine in combination a set of rolls adapted to receive between them a bellows-folded bag and feed the same forward, a set of discharge-rolls, said bag being in the grasp of both of said sets at the same time, means intermediate of said sets and including an exhaust device rotatable with said receiving-rolls and adapted to engage said bag and distend the same and automatic means also intermediate of said sets for folding the corners of said bag backward between said plies.

12. In a bag-machine in combination, a rotatable suction device adapted to contact with a flattened bellows-folded bag, means to exhaust the air from said suction device and rotate the same whereby the plies are distended, distending-fingers, and means to insert the same between said plies and move them apart and transversely of the axis of said rotatable suction device to assist in distending the same.

13. In a bag-folding machine in combination, means to hold a portion of a bellows-folded bag in a flattened condition, distending-fingers, means to insert said fingers between the plies of said bag near the bottom of said bag and move said fingers apart to distend said plies at the bottom of said bag, and a folder to press upon the bottom of said bag and turn back a corner while said fingers are distending the plies.

14. In a bag-folding machine in combination, means to hold a portion of a bellows-folded bag in a flattened condition, distending-fingers, means to insert said fingers between the plies of said bag near the bottom of said bag and move said fingers apart to distend said plies at the bottom of said bag, and a folder to press upon the bottom of said bag and turn back the corners while said fingers are distending said plies, and means to fold said plies down over said turned-in corners.

15. In a bag-folding machine in combination, means to hold a portion of a bellows-folded bag in a flattened condition, distending-fingers, means to insert said fingers between the plies of said bag near the bottom of said bag and move said fingers apart to distend said plies and part of the bottom of said bag to define one edge of said bottom, means to advance said bag, an inclined-faced auxiliary folder to press upon the bottom of said bag as same is advanced and turn back one corner while said fingers are distending the plies, and means to fold said plies down over said turned-in corner.

16. In a bag-machine in combination, a roll adapted to feed forward and open the plies of a flattened bellows-folded bag, distending-fingers, means to insert said fingers between the plies of said bag and move the same to a distance from each other and away from said roll whereby said plies are distended.

17. In a bag-folding machine in combination, means to feed forward a flattened bellows-folded bag, distending-fingers, means to insert said fingers between the plies of said bag and move said fingers apart near the bottom of said bag whereby said plies are distended near the bottom of the bag, and means to at the same time advance said fingers along with said bag, a folder to fold back a corner of said bag while the plies are being distended, and means to fold said distended plies down upon said corner.

18. In a bag-folding machine in combination, means to hold a flattened bellows-folded bag, distending-fingers, actuating means to insert said fingers between the plies of said bag and move said fingers apart and advance said fingers along with said bag whereby said plies are distended, said actuating means including a spiral upon which one of said fingers moves.

19. In a bag-folding machine in combination, means to hold a bellows-folded closed-bottom bag, a plurality of distending-fingers at one side of the bag, and means to insert the same between the plies thereof and move said fingers in opposite directions to distend said bag at the bottom of the same, and a folding device adapted to simultaneously press upon the bottom of said bag and fold back a portion of said bottom while the plies are being distended.

20. In a bag-folding machine in combination, means to feed forward a bellows-folded bag, a plurality of distending-fingers at one side of the bag, and means to insert the same between the plies thereof and move said fingers in opposite directions to distend said bag at the bottom of the same, and a stationary inclined-face folding device adapted to simultaneously press upon the bottom of said bag and fold back a corner of said bottom.

21. In a bag-machine in combination, a rotatable suction device adapted to contact with a flattened completed bellows-folded bag, means to exhaust air from said suction device, means to rotate the same to distend said bag, means to automatically release the vacuum after the bag is distended, and means to fold back the corners between the plies of the bag.

22. In a bag-machine in combination, a roll adapted to hold part of a complete bellows-folded bag in a substantially flattened condition, a suction device rotatable with said roll and adapted to contact with said bag, means to exhaust the air from said suction device and distend the bag at its bottom, and means to automatically fold back the corners thereof between the plies.

23. In a bag-machine in combination, a set of rolls provided with suction devices adapted to receive between them a bellows-folded bag, means to exhaust air from said suction devices and rotate the rolls to distend the bag at its bottom, means adapted to enter between the plies of the bag and assist in distending the same, and means to fold the corners of said bag backward between the plies thereof.

24. In a bag-folding machine in combination, a set of rolls adapted to receive between them and feed forward a bellows-folded bag, means rotatable with said rolls adapted to engage said bag and distend the same, a stationary guide to receive the central portion of said bag as it leaves said rolls and hold the same in a substantially flattened condition while the plies are being distended, and means to fold the corners of the bottom of said bag backward between the plies thereof.

Signed at New York, N. Y., this 26th day of November, 1900.

GEORGE R. WARD.

Witnesses:
 EMERSON R. NEWELL,
 JOSEPH E. DIAMOND.